US012631548B2

(12) United States Patent
Ogawa et al.

(10) Patent No.: US 12,631,548 B2
(45) Date of Patent: May 19, 2026

(54) OPTICAL SENSOR SYSTEM

(71) Applicant: Asahi Kasei Microdevices Corporation, Tokyo (JP)

(72) Inventors: Tomohiko Ogawa, Tokyo (JP); Yoshihiko Koizumi, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 619 days.

(21) Appl. No.: 18/180,126

(22) Filed: Mar. 8, 2023

(65) Prior Publication Data

US 2023/0288319 A1 Sep. 14, 2023

(30) Foreign Application Priority Data

Mar. 14, 2022 (JP) ................................. 2022-039618
Feb. 13, 2023 (JP) ................................. 2023-020270

(51) Int. Cl.
  *G01N 21/17* (2006.01)
  *G01N 21/3504* (2014.01)
(52) U.S. Cl.
  CPC ..... *G01N 21/1702* (2013.01); *G01N 21/3504* (2013.01); *G01N 2021/1704* (2013.01)
(58) Field of Classification Search
  CPC ........... G01N 21/1702; G01N 21/3504; G01N 2021/1704; G01N 21/61; G01N 2201/0624; G01N 2201/1211; G01N 29/2425; G01N 2291/02466; G01N 2291/02809
  See application file for complete search history.

(56) References Cited

U.S. PATENT DOCUMENTS

| | | | |
|---|---|---|---|
| 2002/0121126 A1* | 9/2002 | Kouznestov | ......... G01N 21/274 |
| | | | 73/1.06 |
| 2012/0140231 A1 | 6/2012 | Knox et al. | |
| 2012/0281220 A1 | 11/2012 | Scherer et al. | |
| 2013/0194390 A1* | 8/2013 | Hirooka | ............... G01C 11/025 |
| | | | 348/47 |
| 2016/0081626 A1* | 3/2016 | Takahashi | ............ A61B 5/7225 |
| | | | 600/479 |
| 2018/0136166 A1* | 5/2018 | Voinea | ............... G01N 21/1702 |
| 2019/0146086 A1 | 5/2019 | Sato et al. | |

FOREIGN PATENT DOCUMENTS

| | | | |
|---|---|---|---|
| CN | 1384350 A | 12/2002 | |
| CN | 109946706 A | 6/2019 | |
| JP | S5860225 A | 4/1983 | |
| JP | 2002055049 A | 2/2002 | |
| JP | 2004271518 A | 9/2004 | |
| WO | WO-2010124347 A1 * | 11/2010 | ............. G01N 21/53 |
| WO | WO-2014130970 A2 * | 8/2014 | ........... G01N 21/645 |

* cited by examiner

*Primary Examiner* — David Z Huang
(74) *Attorney, Agent, or Firm* — KENJA IP LAW PC

(57) ABSTRACT

Provided is a sensor system having an improved SNR. The sensor system (1) includes: a sensor (gas sensor 10) including a light-emitting element (11) and a detecting element (light-receiving element 12) that detects a signal that is based on light emitted from the light-emitting element; and a computation device (20) that, by taking an interval in which the light-emitting element emits light as an ON interval and an interval in which the light-emitting element does not emit light as an OFF interval, uses the signal as detected in the ON interval and the signal as detected in a plurality of the OFF interval to compute one measurement value.

17 Claims, 6 Drawing Sheets

Storage section

| OFF | ON | OFF | ON | OFF | ON | OFF | ON | OFF | ON | OFF | ON | OFF | ON | OFF | ON |
|---|---|---|---|---|---|---|---|---|---|---|---|---|---|---|---|
| -0.292 | +1 | -0.292 | 0 | -0.292 | 0 | -0.292 | 0 | -0.292 | 0 | -0.292 | 0 | -0.292 | 0 | -0.292 | 0 |

⇒

| OFF | ON | OFF | ON | OFF | ON | OFF | ON | OFF | ON | OFF | ON | OFF | ON | OFF | ON |
|---|---|---|---|---|---|---|---|---|---|---|---|---|---|---|---|
| -0.320 | +1.012 | -0.320 | +0.012 | -0.320 | +0.012 | -0.320 | +0.012 | -0.320 | +0.012 | -0.320 | +0.012 | -0.320 | +0.012 | -0.320 | +0.012 |

OPTICAL SENSOR SYSTEM

CROSS-REFERENCE TO RELATED APPLICATIONS

The present application claims priority of Japanese Patent Application No. 2022-039618 (filed Mar. 14, 2022) and Japanese Patent Application No. 2023-020270 (filed Feb. 13, 2023), the entire contents of which are incorporated herein by reference.

TECHNICAL FIELD

The present disclosure relates to a sensor system.

BACKGROUND

In recent years, there has been ongoing development of non-dispersive infrared (NDIR) gas sensors (for example, refer to Patent Literature (PTL) 1). An NDIR gas sensor includes a light emitter that emits infrared light and a light receiver that receives infrared light that has passed through a detection target gas (for example, alcohol or carbon dioxide) and uses absorption characteristics of infrared light in the gas in order to detect the concentration of the gas.

CITATION LIST

Patent Literature

PTL 1: JP 2004-271518 A

SUMMARY

There is demand for further improvement of the signal-to-noise ratio (SNR) in systems using sensors such as NDIR gas sensors.

In view of the situation set forth above, an object of the present disclosure is to provide a sensor system having an improved SNR.

[1] A sensor system according to an embodiment of the present disclosure comprises:

a sensor including a light-emitting element and a detecting element that detects a signal that is based on light emitted from the light-emitting element; and a computation device that, by taking an interval in which the light-emitting element emits light as an ON interval and an interval in which the light-emitting element does not emit light as an OFF interval, uses the signal as detected in the ON interval and the signal as detected in a plurality of the OFF interval to compute one measurement value.

[2] As an embodiment of the present disclosure, in the foregoing [1], a duty cycle that is a ratio of the ON interval relative to a total of the ON interval and the OFF interval is 50% or more.

[3] As an embodiment of the present disclosure, in the foregoing [1] or [2], the computation device uses the signal as detected in a plurality of the OFF interval before and after the ON interval to compute the measurement value.

[4] As an embodiment of the present disclosure, in the foregoing [3], a number of the OFF interval before the ON interval and a number of the OFF interval after the ON interval are the same.

[5] As an embodiment of the present disclosure, in any one of the foregoing [1] to [4], the computation device performs weighting of the signal as detected in the ON interval and the signal as detected in the OFF interval to compute the measurement value.

[6] As an embodiment of the present disclosure, in the foregoing [5], the computation device performs the weighting such that an effect on the signal of variation of a measurement target is canceled out.

[7] As an embodiment of the present disclosure, in any one of the foregoing [1] to [6], the detecting element is a light-receiving element, the sensor is an NDIR gas sensor, and the measurement value is a gas concentration of a gas that is to be detected.

[8] As an embodiment of the present disclosure, in any one of the foregoing [1] to [6], the detecting element is a microphone, the sensor is a photoacoustic gas sensor, and the measurement value is a gas concentration of a gas that is to be detected.

[9] As an embodiment of the present disclosure, in any one of the foregoing [1] to [6], the detecting element is a light-receiving element, the sensor is a photoplethysmographic sensor, and the measurement value is a pulse wave.

[10] As an embodiment of the present disclosure, in any one of the foregoing [1] to [6], the detecting element is a light-receiving element, the sensor is a range sensor, and the measurement value is a distance to a target.

[11] As an embodiment of the present disclosure, in any one of the foregoing [1] to [10], a repetition period of the ON interval and the OFF interval is 1 second or less.

[12] As an embodiment of the present disclosure, in any one of the foregoing [1] to [11], a duty cycle that is a ratio of the ON interval relative to a total of the ON interval and the OFF interval is within a range indicated by formula (a), shown below, $$\frac{5k - 1 - \sqrt{9k^2 - 10k + 1}}{8k} < D < \frac{5k - 1 + \sqrt{9k^2 - 10k + 1}}{8k} \tag{a}$$

where k is a number of the plurality of the OFF interval.

[13] As an embodiment of the present disclosure, in any one of the foregoing [1] to [11], a duty cycle that is a ratio of the ON interval relative to a total of the ON interval and the OFF interval is within a range indicated by formula (b), shown below, $$\frac{3k + 1}{4k + 4} - \frac{k - 1}{4k + 4} < D < \frac{3k + 1}{4k + 4} + \frac{k - 1}{4k + 4} \tag{b}$$

where k is a number of the plurality of the OFF interval.

According to the present disclosure, it is possible to provide a sensor system having an improved SNR.

BRIEF DESCRIPTION OF THE DRAWINGS

In the accompanying drawings:

FIG. 2 is a diagram illustrating a configuration example of a gas sensor included in the sensor system illustrated in FIG. 1;

FIG. 6 is a diagram for describing weighting.

DETAILED DESCRIPTION

Figure 1:
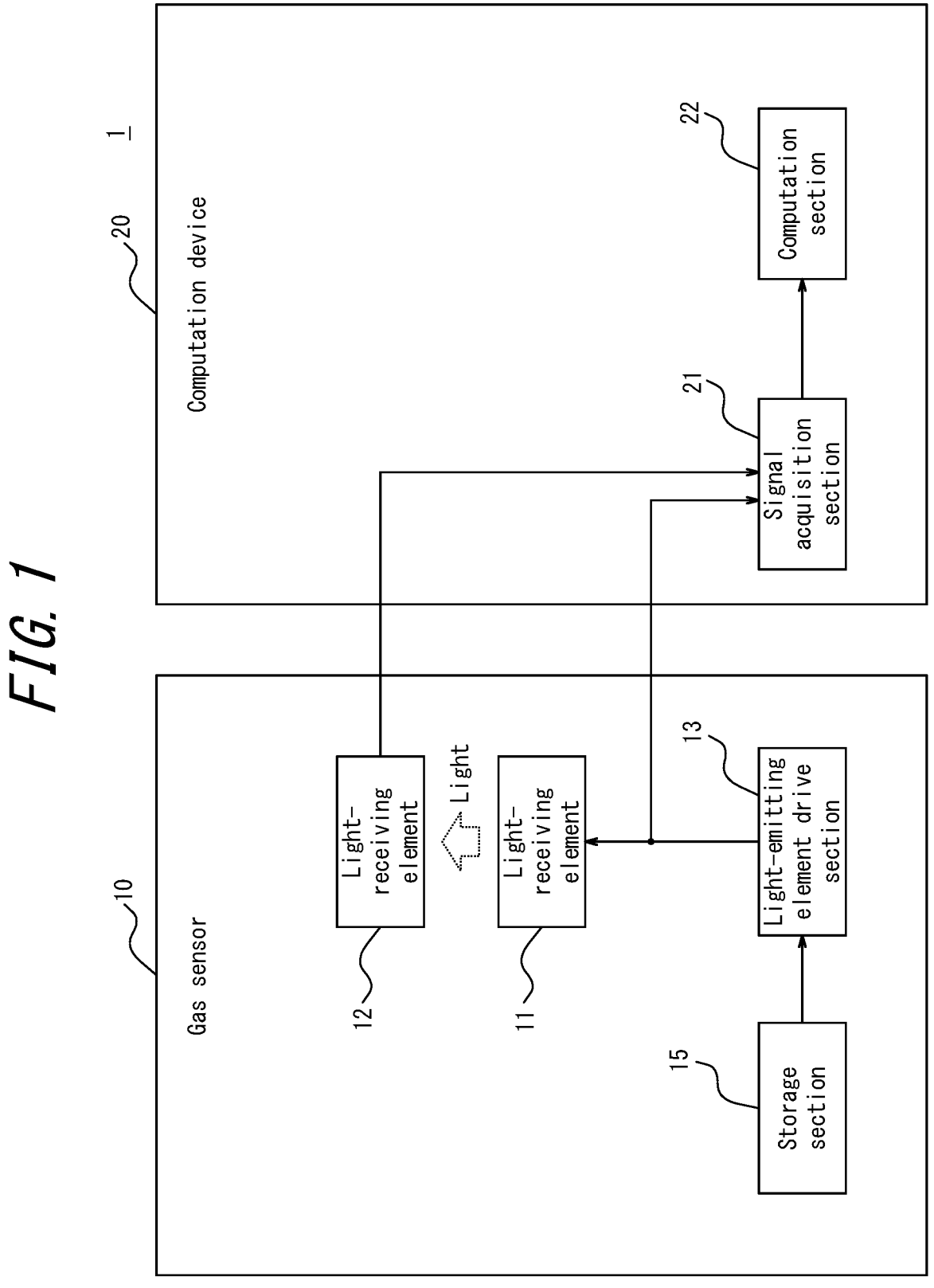
FIG. 1 is a diagram illustrating a configuration example of a sensor system according to an embodiment of the present disclosure.

The following describes a sensor system according to an embodiment of the present disclosure with reference to the drawings. Parts in the drawings that are the same or correspond are allotted the same reference signs. In description of the present embodiment, descriptions of parts that are the same or correspond may be omitted or abbreviated as appropriate.

<Sensor System>

FIG. 1 is a diagram illustrating a configuration example of a sensor system 1 according to the present embodiment. The sensor system 1 includes: a sensor including a light-emitting element 11 and a detecting element that detects a signal that is based on light emitted from the light-emitting element 11; and a computation device 20 that computes a measurement value. No limitations are placed on the detecting element and the measurement value in the sensor system 1. In the present embodiment, a description is given for a case in which the detecting element is a light-receiving element 12, the sensor is an NDIR gas sensor 10, and the measurement value is a gas concentration of a gas that is to be detected. In an NDIR method, the concentration of a gas is measured through detection of the amount of absorption of infrared light by exploiting the fact that the wavelength of infrared light that is absorbed differs depending on the type of gas. The measurement target gas may be alcohol, carbon dioxide, or the like, for example, but is not limited to these gases. In the present embodiment, infrared light present after absorption by the gas that is to be detected corresponds to a signal that is based on light emitted from the light-emitting element 11.

The sensor system 1 may also have configurations such as described below. For example, in the sensor system 1, the detecting element may be a microphone, the sensor may be a photoacoustic gas sensor, and the measurement value may be a gas concentration of a gas that is to be detected. In a photoacoustic method, the concentration of a gas is measured through vibrations of gas molecules that have absorbed light being picked up as sound using a high-performance microphone. In this configuration, the vibrations of gas molecules that have absorbed light correspond to a signal that is based on light emitted from the light-emitting element 11. Alternatively, in the sensor system 1, the detecting element may be a light-receiving element 12, the sensor may be a photoplethysmographic sensor, and the measurement value may be a pulse wave, for example. The pulse wave is a waveform indicating blood vessel volumetric change that arises in accompaniment to pumping of blood by the heart. Alternatively, in the sensor system 1, the detecting element may be a light-receiving element 12, the sensor may be a range sensor, and the measurement value may be a distance to a target. The range sensor measures the distance based on time taken for light emitted from the light-emitting element 11 to be reflected and then received, for example. A proximity sensor that detects proximity of a target may be used as the range sensor. As set forth above, the configuration of the sensor system 1 is not limited, but is described below for a case in which the sensor is an NDIR gas sensor 10.

<Gas Sensor>

In the present embodiment, the gas sensor 10 includes a light-emitting element 11 and a light-receiving element 12.

The gas sensor 10 may further include a light-emitting element drive section 13 and a storage section 15.

(Light-Emitting Element)

The light-emitting element 11 outputs light including a wavelength that is absorbed by a measurement target gas. Specific examples of the light-emitting element 11 include a light-emitting diode (LED) and a microelectromechanical systems (MEMS) light source. In the present embodiment, the light-emitting element 11 is an infrared LED.

The wavelength of the infrared light may be 2 μm to 12 μm. The region of 2 μm to 12 μm is a wavelength band that is particularly suitable for use in the gas sensor 10 due to a large number of absorption bands that are characteristic of various gases being present in this region. For example, an absorption band for methane is present at a wavelength of 3.3 μm, an absorption band for carbon dioxide is present at a wavelength of 4.3 μm, and an absorption band for alcohol (ethanol) is present at a wavelength of 9.5 μm. In the present embodiment, the gas that is to be detected includes alcohol, and infrared light of a wavelength band inclusive of 9.5 μm is used.

(Light-Receiving Element)

The light-receiving element 12 has sensitivity to a band of light including a wavelength that is absorbed by the measurement target gas.

As a specific example, the light-receiving element 12 may be a quantum sensor such as a photodiode having a PIN structure. In the present embodiment, the light-receiving element 12 is a quantum infrared sensor.

(Light-Emitting Element Drive Section)

The light-emitting element drive section 13 outputs a drive signal to the light-emitting element 11 and causes the light-emitting element 11 to emit light with a specific brightness. The light-emitting element drive section 13 may cause the light-emitting element 11 to emit light through constant-current driving, for example. Moreover, the light-emitting element drive section 13 may generate a drive signal (drive voltage) that is adjusted in accordance with environmental temperature based on a correction parameter acquired from the storage section 15 and may output the temperature-corrected drive signal to the light-emitting element 11. The correction parameter may be generated based on a commonly known temperature correction technique.

(Storage Section)

In a case in which a function of the light-emitting element drive section 13 is implemented through software, the storage section 15 may store a program that causes a processor included in the gas sensor 10 to function as the light-emitting element drive section 13. In addition, the storage section 15 may store a correction parameter or the like that is used to generate the drive signal of the light-emitting element drive section 13. The storage section 15 may be composed of at least one memory. The memory may be semiconductor memory, magnetic memory, optical memory, or the like, for example, but can be any memory without limitation to these examples.

(Mold Resin)

Figure 2:
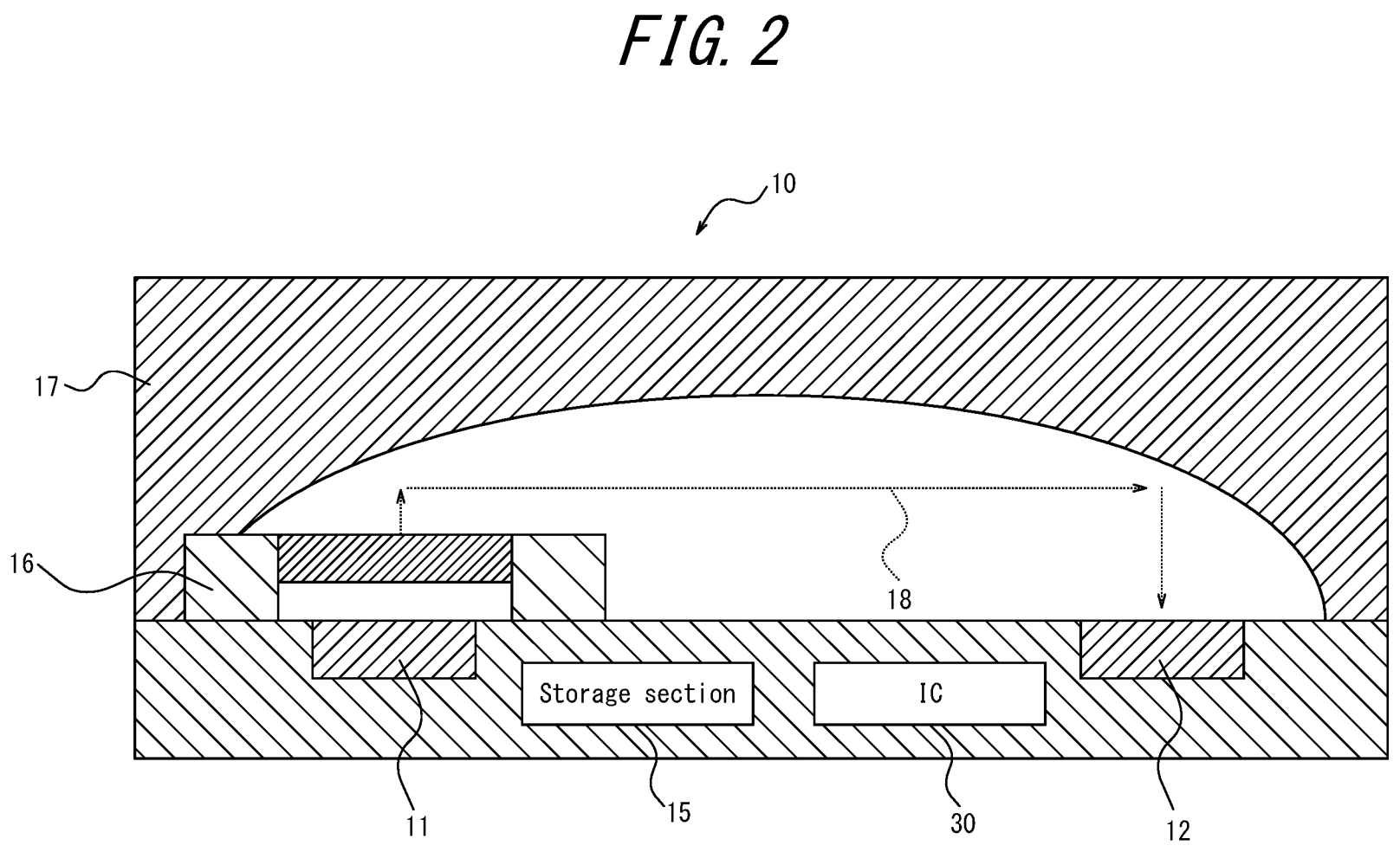

The gas sensor 10 may have a configuration in which the constituent members described above are packaged together with optical members as illustrated in FIG. 2. At least one of the light-emitting element 11 and the light-receiving element 12 in the gas sensor 10 is sealed by a mold resin. In the example illustrated in FIG. 2, the light-emitting element 11 and the light-receiving element 12 are sealed together with the storage section 15 and an IC 30 by a mold resin. The IC 30 includes at least one processor and implements the function of the light-emitting element drive section 13 in the present embodiment.

(Light Guide)

A reflector 17 is provided in order that light 18 emitted from the light-emitting element 11 is reflected and irradiates the light-receiving element 12. In other words, in the present embodiment, the gas sensor 10 includes a reflector 17 that functions as a light guide that guides light 18 from the light-emitting element 11 to the light-receiving element 12. In the example illustrated in FIG. 2, the reflector 17 is a concave mirror. A reflecting surface of the reflector 17 may be formed of a metal having high reflectance such as aluminum or gold, for example.

(Filter)

In the present embodiment, the gas sensor 10 includes a filter 16 that is provided with respect to at least one of the light-emitting element 11, the light-receiving element 12, and the light guide and that limits the wavelength of the light 18 as illustrated in FIG. 2. In a case in which the measurement target gas is alcohol (ethanol), for example, the filter 16 may be a bandpass filter that transmits infrared light in a wavelength band in which significant absorption of infrared light by ethanol occurs (typically around 9.5 μm).

(Diode Structure)

In the present embodiment, the light-emitting element 11 is an infrared LED. Moreover, in the present embodiment, the light-receiving element 12 is a quantum infrared sensor. At least one of the light-emitting element 11 and the light-receiving element 12 may contain at least one of indium and gallium and at least one of arsenic and antimony as materials and have a diode structure that at least includes two types of layers of a p-type semiconductor and an n-type semiconductor.

<Computation Device>

In the present embodiment, the computation device 20 includes a signal acquisition section 21 and a computation section 22. The computation device 20 may be a device including a processor or the like that performs computation and may be implemented through a computer, for example. In a case in which the computation device 20 is a computer, a signal from the gas sensor 10 may be acquired by a communication device included in the computer, and then a gas concentration may be computed by a central processing unit (CPU) or the like of the computer. In another example, the computation device 20 may be implemented through the IC 30 of the gas sensor 10. In this case, the gas sensor 10 is a device having the computation device 20 incorporated therein and may individually constitute the sensor system 1.

Functions of the signal acquisition section 21 and the computation section 22 can be implemented through software. For example, at least one program may be stored in a storage device that can be accessed by a processor included in the computation device 20.

The program stored in the storage device may cause the computation device 20 to function as the signal acquisition section 21 and the computation section 22 when the program is read by the processor included in the computation device 20.

(Signal Acquisition Section)

The signal acquisition section 21 acquires at least a detection signal output from the light-receiving element 12 and a drive signal of the light-emitting element 11. The signal acquisition section 21 outputs the acquired signals to the computation section 22.

(Computation Section)

The computation section 22 computes a gas concentration based on signals acquired by the signal acquisition section 21. For example, the computation section 22 can compute the gas concentration by computing the received amount of light of a wavelength that is absorbed by the measurement target gas from the detection signal of the light-receiving element 12 and comparing this received amount of light with the received amount of light in a situation in which the measurement target gas is not present. Moreover, the computation section 22 performs computation processing for SNR improvement described below.

(Computation Processing)

Figure 3:
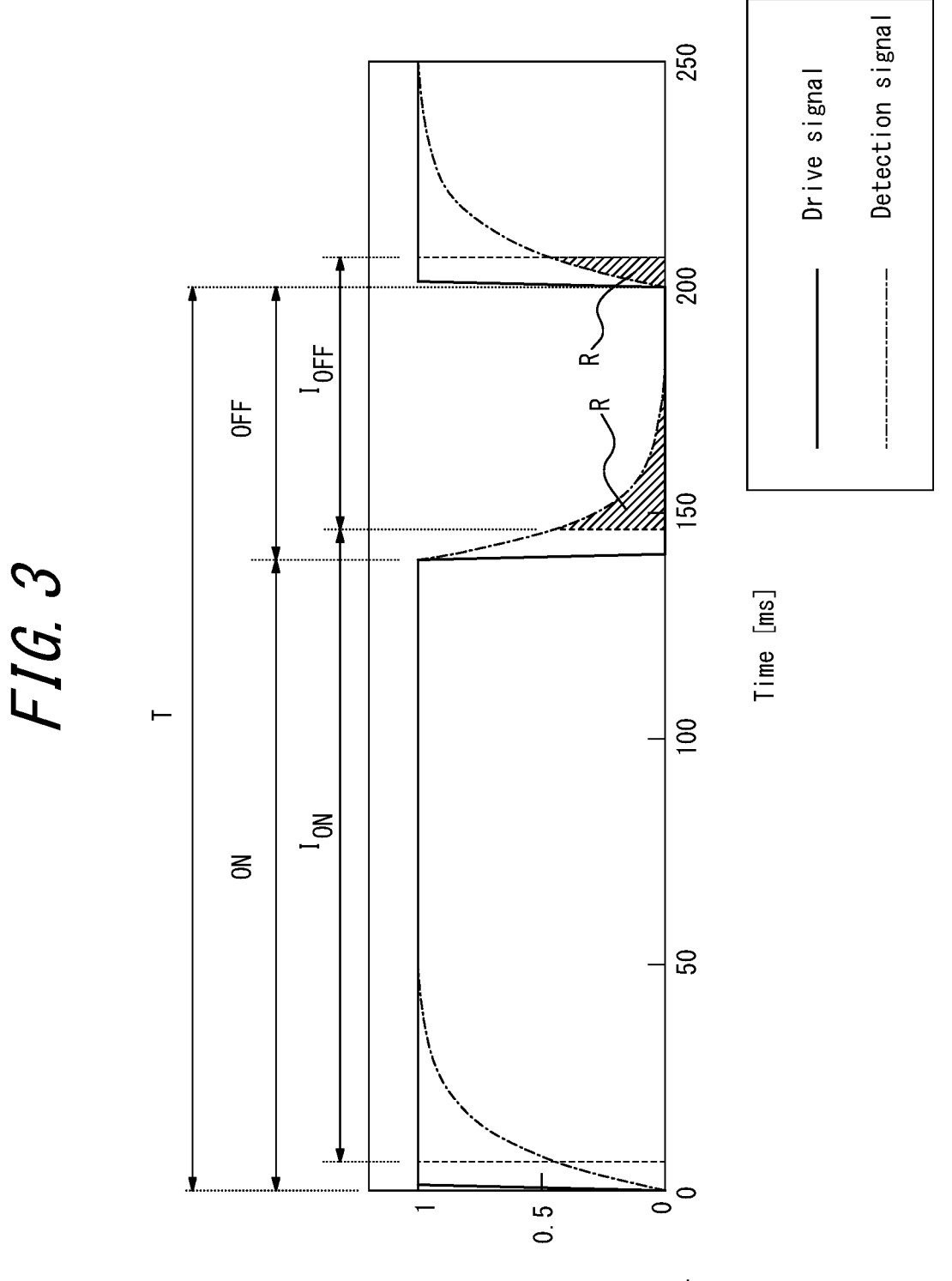
FIG. 3 is a diagram illustrating an example of timing of a drive signal and a detection signal.

The light-emitting element 11, in accordance with the drive signal from the light-emitting element drive section 13, emits light for just a specific time, and then, after a period in which the light-emitting element 11 does not emit light, emits light for just the specific time once again. FIG. 3 is a diagram illustrating an example of timing of the drive signal output from the light-emitting element drive section 13 and the detection signal output from the light-receiving element 12. An ON interval and an OFF interval are defined in accordance with the drive signal as illustrated in FIG. 3. The ON interval is an interval in which the light-emitting element 11 emits light. Moreover, the OFF interval is an interval in which the light-emitting element 11 does not emit light. In the present embodiment, the ON interval and the OFF interval are repeated with a period T during operation of the light-emitting element 11. The period T is 200 ms in the example illustrated in FIG. 3, but is not limited to a particular value. Moreover, the ON interval and the OFF interval may have different durations as in the example illustrated in FIG. 3 or may have the same duration (for example, may each be 100 ms). In the drawings, the ON interval and the OFF interval are also denoted simply as ON and OFF. Furthermore, in the example illustrated in FIG. 3, the drive signal and the detection signal are indicated as normalized signals with a maximum value of 1. An integral interval $I_{ON}$ and an integral interval $I_{OFF}$ are defined using 0.5 as a criterion for the detection signal. The detection signal in the integral interval $I_{ON}$ is integrated to compute the received amount of light in a situation in which the light-emitting element 11 is emitting light. Moreover, the detection signal in the integral interval $I_{OFF}$ is integrated to compute the received amount of light in a situation in which the light-emitting element 11 is not emitting light. An error R that is due to transient response of the detection signal is described further below.

The SNR in the sensor system 1 can be improved through reduction of noise in the sensor system 1. One example of noise is dark current. As an effect of dark current, the received amount of light is not zero even in the OFF interval. The effect of dark current has conventionally been excluded by correlated double sampling (CDS) in which the received amount of light in an OFF interval is taken as a reference signal and the received amount of light in an ON interval is taken as a data signal in a period T, and a difference between the data signal and the reference signal is computed. However, dark current may momentarily change, and there is a limit to improvement of the SNR through this conventional technique. The sensor system 1 according to the present embodiment enables greater SNR improvement than the conventional technique by using a signal detected in an ON interval and a signal detected in a plurality of OFF intervals to compute one measurement value.

Figure 4:
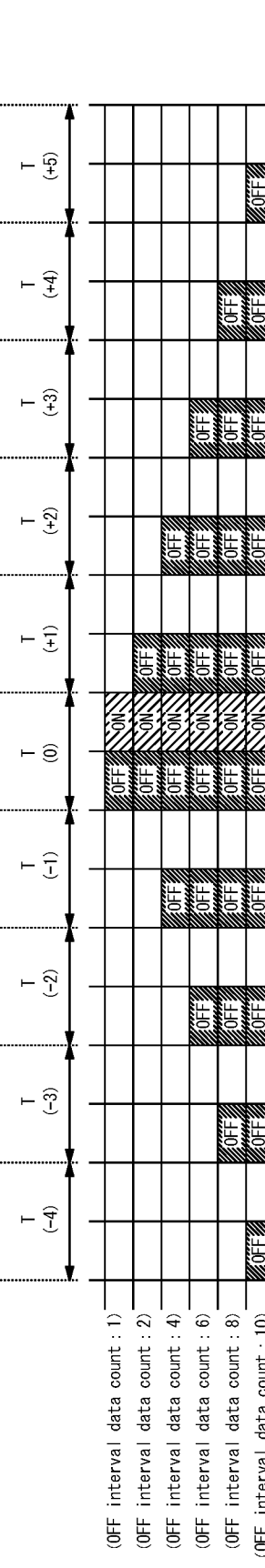
FIG. 4 is a diagram illustrating examples of ON and OFF intervals that are used depending on an OFF interval data count.

FIG. 4 is a diagram illustrating ON and OFF intervals that are used depending on an OFF interval data count. A case in which the OFF interval data count is 1 corresponds to conventional correlated double sampling. In the present embodiment, the computation device 20 computes a moving average for the received amount of light in OFF intervals with an OFF interval data count of at least 2, and computes a difference between the received amount of light in an ON interval and the computed value for the moving average. In a situation such as when the NDIR gas sensor 10 is to be installed in a vehicle and used to measure alcohol, for example, high responsiveness is demanded for an ON interval because it is necessary to perform measurement while a user is breathing onto the NDIR gas sensor 10. In contrast, high responsiveness is not demanded for an OFF interval because this is a time during which measurement is not performed. Therefore, it is possible to average a plurality of OFF intervals at different timings in order to exclude the effect of momentary changes of noise.

Note that the number appended to each period T in FIG. 4 takes a period T used for computing the received amount of light in an ON interval as a reference (0), and is indicated as a negative number before the reference and as a positive number after the reference. In the example illustrated in FIG. 4, the computation device 20 uses a signal detected in a plurality of OFF intervals before and after an ON interval to compute a measurement value. However, the computation device 20 may use a plurality of OFF intervals before the ON interval or a plurality of OFF intervals after the ON interval to perform computation. Moreover, in the example illustrated in FIG. 4, the number of OFF intervals before the ON interval and the number of OFF intervals after the ON interval are the same. Noise such as dark current typically changes almost linearly before and after an ON interval. Therefore, by using a plurality of OFF intervals before and after the ON interval, it is possible to cancel out the almost linear change of noise and more accurately compute noise at a time corresponding to the ON interval. Moreover, the effect of canceling out the linear change described above can be enhanced by adopting the same number of OFF intervals before and after the ON interval.

Although an ON interval and an OFF interval can be freely set as described above, a duty cycle that is a ratio of the ON interval relative to the total of the ON interval and the OFF interval (i.e., the period T) affects improvement of the SNR. The number of OFF intervals that the computation device 20 uses to compute one measurement value (i.e., the OFF interval data count) also affects improvement of the SNR. Firstly, the duty cycle is indicated by the following formula (1).

$$D = \frac{m}{n + m} \qquad (1)$$

In formula (1), "m" is the duration of the ON interval. Moreover, "n" is the duration of the OFF interval. When the ON interval and the OFF interval are each 100 ms, for example, the duty cycle is 50%.

$P_{SNR}$, which is a parameter for relative comparison of SNR, is indicated by the following formula (2). A larger value for $P_{SNR}$ indicates improvement of the SNR.

$$P_{SNR} = \frac{1}{\sqrt{\frac{1}{n \times k} + \frac{1}{m}}} \qquad (2)$$

In formula (2), "k" is the number of OFF intervals. In a case in which the OFF interval data count is 10 (refer to FIG. 4), for example, "k" is 10. The period T is indicated by the following formula (3).

$$T = n + m \qquad (3)$$

Based on formula (1), formula (2), and formula (3), $P_{SNR}$ can also be indicated by the following formula (4).

$$P_{SNR} = \frac{\sqrt{T}}{\sqrt{\frac{1}{(1 - D) \times k} + \frac{1}{D}}} \qquad (4)$$

In a case in which the period T is a constant, a duty cycle with which $P_{SNR}$ is at a maximum is indicated by the following formula (5) assuming that $k \geq 2$.

$$D = \frac{k - \sqrt{k}}{(k - 1)} \qquad (5)$$

In this case, the maximum value $P_{SNR\_MAX}$ of $P_{SNR}$ is indicated by the following formula (6). In formula (6), the period T is a constant.

$$P_{SNR\_MAX} = \sqrt{T} \frac{k - \sqrt{k}}{(k - 1)} \qquad (6)$$

Moreover, the duty cycle with which $P_{SNR}$ is at a maximum when k=1 is ½ (i.e., 50%). In this case, the maximum value of $P_{SNR}$ is $\sqrt{T}/2$. By setting the OFF interval data count as 2 or more, there is a greater effect on improvement of the SNR than in a case in which the OFF interval data count is 1. When the SNR is indicated by formula (4), duty cycles that yield greater improvement than T/2 (i.e., the maximum value of the SNR when the OFF interval data count is 1) are of a range indicated by the following formula (7).

$$\frac{5k - 1 - \sqrt{9k^2 - 10k + 1}}{8k} < D < \frac{5k - 1 + \sqrt{9k^2 - 10k + 1}}{8k} \qquad (7)$$

Figure 5:
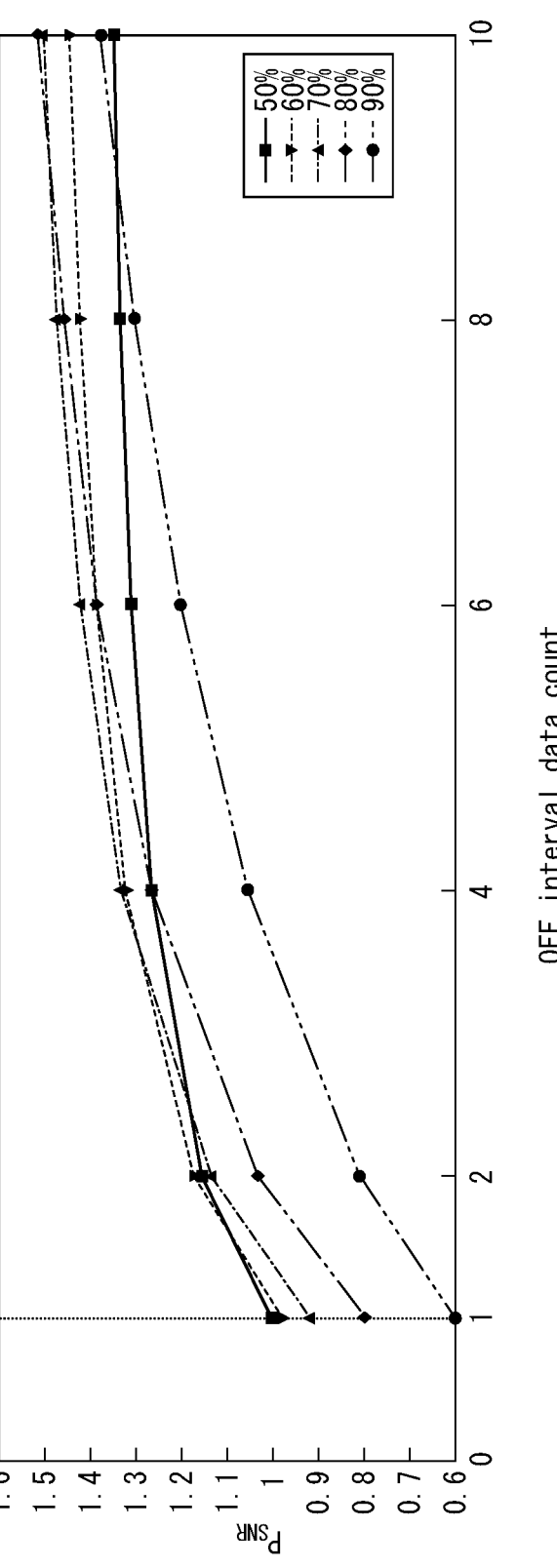
FIG. 5 is a diagram illustrating an example of change of a parameter indicating SNR enhancement.

FIG. 5 illustrates change of the value of $P_{SNR}$ relative to the OFF interval data count for each of various duty cycles. As illustrated in FIG. 5, in a case in which the OFF interval data count is 10, for example, there is greater improvement of the SNR when the duty cycle exceeds 50% than when the duty cycle is 50%. A duty cycle exceeding 50% means that detection time in an OFF interval is shorter than an ON interval when observing a single period T, which leads to relative reduction of the accuracy of data for the OFF interval. However, sufficient data accuracy can be ensured in the present embodiment because OFF interval data is given as an average for a plurality of OFF intervals. Moreover, in a case in which the OFF interval data count is 10, improvement of the SNR is greater when the detection time in an OFF interval is shorter than an ON interval in a single period T than when the duty cycle is 50%.

Even in a case in which the OFF interval data count is less than 10, the adoption of an appropriate duty cycle makes it possible to achieve greater improvement of the SNR than when the duty cycle is 50% as illustrated in FIG. 5. For example, in a case in which the OFF interval data count is 4, the SNR can be improved by adopting a duty cycle of 60% or 70%. In a case in which the computation device 20 uses OFF intervals before and after an ON interval to compute a measurement value, a larger OFF interval data count will result in more time being required from acquisition of data for the ON interval until completion of computation. In other words, time waiting for OFF interval data acquired after the ON interval arises. Therefore, it is preferable to adjust the duty cycle and the like in the sensor system 1 based on the time by which output of a measurement value is required, the improvement of the SNR that is required, and so forth.

In a case in which the OFF interval data count is 2 or more and the SNR is indicated by formula (4), a range of duty cycles with which there is greater improvement of the SNR than with a duty cycle of 50% is indicated by the following formula (8). From a viewpoint of SNR improvement, it is preferable that the duty cycle is within the range in formula (8).

$$\frac{3k+1}{4k+4} - \frac{k-1}{4k+4} < D < \frac{3k+1}{4k+4} + \frac{k-1}{4k+4} \qquad (8)$$

The computation device 20 may perform weighting of each of the signal detected in the ON interval and the signal detected in the OFF interval to compute the measurement value. As illustrated in FIG. 3, the integral interval $I_{ON}$ is shifted such that it does not match the ON interval. Moreover, the integral interval $I_{OFF}$ is shifted such that it does not match the OFF interval. This shift arises due to transient response of the detection signal and is affected by variation of the measurement target (gas to be detected in the present embodiment). The error R illustrated in FIG. 3 indicates the effect that variation of the measurement target has on the detection signal. The error R arises due to the detection signal for the ON interval shifting into the OFF interval under the influence of variation of the measurement target. In other words, a received amount of light corresponding to the error R should be counted in the ON interval rather than in the OFF interval. The computation device 20 preferably computes the measurement value by performing weighting such that the error R described above is canceled out.

As one example, the duty cycle is set as 70% and the OFF interval data count is set as 8. The upper diagram in FIG. 6 illustrates initial weighting performed by the computation device 20. A positive value is used for an ON interval and a negative value is used for an OFF interval because it is necessary to cancel out dark current through the weighting. The computation device 20 sets the weighting for a signal detected in one ON interval as +1. Moreover, the computation device 20 sets the weighting for a signal detected in each of 8 OFF intervals as −0.292, which is a value obtained when a negative value of a weighting 70/30 (2.333) for a case in which the duty cycle is 70% is divided by 8. In this example, the error R illustrated in FIG. 3 is taken to be 9.6% relative to an integrated value for the received amount of light in the ON interval and the OFF interval. The computation device 20 performs further adjustment for the error R. The computation device 20 adjusts weighting in ON intervals such that there is an increase of 9.6% in total from the initial state as illustrated in the lower diagram in FIG. 6. More specifically, the computation device 20 adds a weighting of +0.012 to a signal in each of 8 ON intervals.

Moreover, the error R per one OFF interval is 1.2% for the 8 OFF intervals. The computation device 20 makes an adjustment by adding a weighting of −0.028, which is 1.2% of −2.333, to each of the 8 OFF intervals. In other words, the weighting of −0.292 for a signal in each of the 8 OFF intervals is adjusted with a weighting of −0.028 to give −0.320. As a result of the computation device 20 adjusting weighting of ON intervals and weighting of OFF intervals in this manner such that the effect of measurement target variation (error R) is zero in total, further SNR improvement can be achieved.

In this manner, the sensor system 1 according to the present embodiment can improve the SNR through the configuration set forth above.

Although an embodiment of the present disclosure has been described based on the various drawings and examples, it should be noted that a person of ordinary skill in the art could easily make various modifications and revisions based on the present disclosure. Accordingly, such modifications and revisions should also be considered to be included within the scope of the present disclosure. For example, functions and the like included in various constituent parts, etc., may be rearranged so long as they are logically consistent. Moreover, a plurality of constituent parts, etc., may be combined as a single part or may be split up. The embodiment according to the present disclosure can also be realized as a program that is run by a processor included in a device or as a storage medium in which a program is recorded. It should be appreciated that these are also included within the scope of the present disclosure.

The invention claimed is:

1. An optical sensor system comprising:
a sensor including a light-emitting element and a detecting element that detects a signal that is based on light emitted from the light-emitting element; and
a computation device that, by taking an interval in which the light-emitting element emits light as an ON interval and an interval in which the light-emitting element does not emit light as an OFF interval, uses the signal as detected in the ON interval and the signal as detected in a plurality of OFF intervals to compute one measurement value, wherein
the plurality of the OFF intervals includes an OFF interval that is farther from the ON interval than a total of the ON interval and the OFF intervals.

2. The optical sensor system according to claim 1, wherein a duty cycle that is a ratio of the ON interval relative to the total of the ON interval and the OFF intervals is 50% or more.

3. The optical sensor system according to claim 1, wherein the computation device uses the signal as detected in a plurality of the OFF intervals before and after the ON interval to compute the measurement value.

4. The optical sensor system according to claim 3, wherein a number of the OFF intervals before the ON interval and a number of the OFF intervals after the ON interval are the same.

5. The optical sensor system according to claim 1, wherein the computation device performs weighting of the signal as detected in the ON interval and the signal as detected in the plurality of the OFF intervals to compute the measurement value.

6. The optical sensor system according to claim 5, wherein the computation device performs the weighting such that effects on the signals as detected in the ON interval and in the plurality of the OFF intervals of variation of a measurement target are canceled out.

7. The optical sensor system according to claim 1, wherein the detecting element is a light-receiving element, the sensor is an NDIR gas sensor, and the measurement value is a gas concentration of a gas that is to be detected.

8. The optical sensor system according to claim 1, wherein the detecting element is a microphone, the sensor is a photoacoustic gas sensor, and the measurement value is a gas concentration of a gas that is to be detected.

9. The optical sensor system according to claim 1, wherein the detecting element is a light-receiving element, the sensor is a photoplethysmographic sensor, and the measurement value is a pulse wave.

10. The optical sensor system according to claim 1, wherein the detecting element is a light-receiving element, the sensor is a range sensor, and the measurement value is a distance to a target.

11. The optical sensor system according to claim 1, wherein a repetition period of the ON interval and an OFF interval is 1 second or less.

12. The optical sensor system according to claim 1, wherein a duty cycle that is a ratio of the ON interval relative to a total of the ON interval and the OFF intervals is within a range indicated by formula (a), shown below, $$\frac{5k - 1 - \sqrt{9k^2 - 10k + 1}}{8k} < D < \frac{5k - 1 + \sqrt{9k^2 - 10k + 1}}{8k} \tag{a}$$

where k is a number of the plurality of the OFF interval.

13. The optical sensor system according to claim 1, wherein a duty cycle that is a ratio of the ON interval relative to a total of the ON interval and the OFF interval is within a range indicated by formula (b), shown below, $$\frac{3k + 1}{4k + 4} - \frac{k - 1}{4k + 4} < D < \frac{3k + 1}{4k + 4} + \frac{k - 1}{4k + 4} \tag{b}$$

where k is a number of the plurality of the OFF interval.

14. The optical sensor system according to claim 2, wherein the duty is greater than 50%, and an SNR is greater than when the duty is 50% in the plurality of the OFF intervals.

15. The optical sensor system according to claim 2, wherein the duty is 70% or more.

16. The optical sensor system according to claim 1, wherein the computation device adjusts weighting of the ON interval and the weightings of the plurality of the OFF intervals such that an integrated value becomes zero for a given input.

17. The optical sensor system according to claim 16, wherein the computation device adjusts the weighting of the ON interval and the weightings of the plurality of the OFF interval such that an integrated value of the light signal components of the light-emitting element over one period, including ON and OFF intervals belonging to the period other than a main ON interval, becomes zero.

* * * * *